(12) United States Patent
Miyoshi et al.

(10) Patent No.: US 8,780,989 B2
(45) Date of Patent: Jul. 15, 2014

(54) MOVING-PICTURE CODING DEVICE AND MOVING-PICTURE CODING METHOD

(75) Inventors: Hidenobu Miyoshi, Kawasaki (JP); Akira Nakagawa, Kawasaki (JP); Kimihiko Kazui, Kawasaki (JP); Hisanari Kimura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1468 days.

(21) Appl. No.: 12/170,098

(22) Filed: Jul. 9, 2008

(65) Prior Publication Data
US 2009/0028246 A1 Jan. 29, 2009

(30) Foreign Application Priority Data

Jul. 13, 2007 (JP) .................................. 2007-184012

(51) Int. Cl.
*H04N 7/12* (2006.01)
(52) U.S. Cl.
USPC ............ 375/240.16; 375/240.13; 375/240.24; 375/240.26; 375/240.29
(58) Field of Classification Search
None
See application file for complete search history.

(56) References Cited

U.S. PATENT DOCUMENTS

| 4,651,206 | A | * | 3/1987 | Ohki | 375/240.16 |
| 5,568,200 | A | * | 10/1996 | Pearlstein et al. | 375/240.27 |
| 6,014,493 | A | * | 1/2000 | Shimoda | 386/314 |
| 2003/0152146 | A1 | * | 8/2003 | Lin et al. | 375/240.16 |
| 2007/0253490 | A1 | * | 11/2007 | Makino | 375/240.24 |

FOREIGN PATENT DOCUMENTS

| JP | 60-146588 | 8/1985 |
| JP | 60-162392 | 8/1985 |
| JP | 6-101841 | 4/1994 |

* cited by examiner

*Primary Examiner* — Faruk Hamza
*Assistant Examiner* — Thinh Tran
(74) *Attorney, Agent, or Firm* — Staas & Halsey LLP

(57) ABSTRACT

A moving-picture coding device that divides a moving-picture signal comprised of a plurality of fields into a plurality of blocks and that can select coded area prediction in a current field and inter-field motion compensation prediction by block units, the moving-picture coding device comprises a forced intra block line determining unit, an intra selecting unit, a vector limit block line determining unit, a vector limit unit, a slice division unit a deblocking filter inhibit unit.

8 Claims, 15 Drawing Sheets

MOVING-PICTURE CODING DEVICE AND MOVING-PICTURE CODING METHOD

CROSS-REFERENCE TO RELATED APPLICATIONS

This application is based upon and claims the benefit of priority from the prior Japanese Patent Application No. 2007-184012 filed on Jul. 13, 2007, the entire contents of which are incorporated herein by reference.

BACKGROUND OF THE INVENTION

1. Field of the Invention

The present invention relates to a moving-picture coding device which performs intra-field prediction coding and inter-field prediction coding of a moving-picture comprised of fields.

2. Description of the Related Art

In general, since the amount of a data in a moving-picture is large, high-efficiency coding is performed when the moving-picture data is transmitted from a transmitting device to a receiving device or when the moving-picture data is stored in a storage device. In this case, "high-efficiency coding" is a coding process for converting a certain data string into another data string and is referred to as a process for compressing the data amount.

ISO/IEC MPEG-2/MPEG-4 (hereinafter referred to as MPEG-2 and MPEG-4) are given as representative moving-picture coding methods. There is a need to shorten the time between coding and reproduction at a transmitting side during real time communication using such a moving-picture coding method. Moreover, a low-delay needs to be achieved in the coding at the transmitting side and the decoding at the receiving side.

Description is made below of a low-delay coding method for the MPEG-2 standard based on the Japanese Laid-Open Patent Publication No. Sho60-162392. The MPEG-2 standard defines three kinds of pictures, I, P, and B. The I picture is a picture which is able to restore the image by information only from itself (intra-frame coding), without using a coding image of another picture or prediction. The P picture is a picture obtained by coding the prediction error generated by the inter-picture prediction (inter-frame coding) performed in a forward direction from a past picture. The B picture is a picture obtained by coding (inter-frame coding) the prediction error generated by the inter-picture prediction performed in a bidirectional direction from a past picture and a future picture. Since the B picture uses the future picture for the prediction, the future picture used for the prediction needs to be coded prior to coding the B picture. Therefore, a process for rearranging the pictures in an order of the coding is necessary.

In this case, the method for achieving the low-delay does not use the B picture in order to avoid the delay (caused by the processing of the future picture prior to the prediction of the current picture) of rearranging the pictures.

Moreover, the processing unit of moving-picture coding is a block of 16*16 pixels (macroblock). There are two kinds of macroblocks. One is an intra macroblock in which intra-picture coding is performed, and the other is an inter macroblock in which inter-picture coding is performed.

The whole picture is circulated with the intra slice at a certain interval by shifting a position of the macroblock line little by little. The intra slice is applied depending on each picture by using an intra slice for coding all the data in a macroblock line (slice) formed by horizontally rearranging a certain macroblock as an intra macroblock. This makes it possible to refresh the whole picture in order to achieve the low-delay of the moving-picture coding described above. By such a refresh method, the picture is basically comprised of only the P picture. The size of a buffer can be smaller by not using the I picture, so that the delay caused by the buffer can be reduced.

In this case, however, if an error occurs in the area before the refresh when the macroblock of the slice other than the intra slice of the P picture performs motion compensation by using the vector without limitation, the error is not coded by the intra slice even though the whole picture is circulated with the intra slice. Thus the error is transmitted in a direction of a space. At worst, the error may remain on a screen. In order to solve this problem, as for the slice in which the coding is performed by the intra slice, Japanese Patent Publication No. Hei6-101841 discloses a method for not transmitting the error by inhibiting motion compensation using a nonzero motion vector for a predetermined period only.

When the intra slice and the method for controlling the motion vector of Sho60-162392 and Hei6-101841 described in the Related Art are applied to ITU-T H.264 (hereinafter referred to as the H.264 standard), an international standard of moving-picture coding, there is a problem. It is impossible to prevent transmitting the error in the direction of a space because of an inherent problem of the coding method of the H.264 standard. A difference between the MPEG-2 and the H.264 standards, and a problem inherent in the H.264 standard, is described below.

A syntax called IntraSlice exists in a slice header in the MPEG-2 standard. The macroblock comprising the specified slice can be specified to be constituted by only the intra macroblock by turning on this flag, in order to generate an intra slice. In the H.264 standard, however, the intra slice cannot be generated because this syntax does not exist. This is called an intra slice problem.

Next, in the method for generating the intra macroblock of the MPEG-2 standard, the macroblock is divided into sub-blocks of 8*8 pixels. A discrete cosine transform (DCT) is then performed on the pixel included in the sub-block. Meanwhile, compressibility is improved in the method for generating the intra macroblock of the H.264 standard by employing a method for using an inter-block pixel correlation obtained by the coding of the prediction in the screen of a plurality of modes. That is, the prediction image is generated from a neighboring pixel of the coding target block in the coding of the intra macroblock.

An orthogonal transform is then performed on a prediction error which is different from the prediction image. In this case, slice division is performed above and below the intra macroblock line when the intra slice is used in the MPEG-2 standard. The intra prediction efficiency becomes constant regardless of the slice division because the intra coding does not use the prediction. In the H.264 standard, however, it is possible to perform the intra coding using the prediction from the neighboring pixel.

The prediction mode used for the prediction from the neighboring pixel, e.g. the prediction from the upper side, is limited when the slice division is performed above and below the intra macroblock line. The prediction mode is limited based on the specification because the prediction image is prohibited from being generated from the neighboring pixel across the slice. In this case, the intra efficiency is reduced because of the slice division. This is called an intra prediction efficiency problem.

Furthermore, the H.264 standard specifies that a deblocking filter is provided at a boundary between the macroblock in the coding process and the neighboring macroblock in order to reduce block distortion. In this case, the area above the intra macroblock is an area where the refresh has been completed, and the area below the intra macroblock is a deteriorated area where the refresh has not been completed. When the deblocking filter is provided at the boundary between the macroblock existing in the deteriorated area and the intra macroblock, the refresh area may deteriorate because the pixel component flows into the refreshed area from the deteriorated area. This is called a deblocking filter problem.

Vector limitation is performed in the MPEG-2 standard in such a way that the motion vector is generated only by the refresh area of the past picture when the motion prediction is performed in a forward direction from the past picture in the P picture. The H.264 standard defines a method for generating the motion vector of the color difference component by the motion vector of the luminance component.

The calculation method varies in three cases depending on parity of a reference source field and a reference target field of the motion vector. One is the case when the both fields have the same parity. Another is the case when the former is the top field and the latter is the bottom field. The other is the case when the former is the bottom field and the latter is the top field. A formula of the case when the reference source is the bottom field and the reference target is the top field is described below.

$$MVCy = MVy/2 + \frac{1}{4}$$

In this case, MVCy is the color difference vector Y direction component, and MVy is the luminance vector Y direction component.

$$MVCy = \frac{1}{4}, \text{ when } MVy = 0$$

The color difference vector is a positive vector and refers to the lower side of the identical position even though the luminance vector is a zero vector. Originally, the reference is supposed to be permitted because the position of the zero vector in the luminance is inside of the refresh area. However, the color difference refers to the lower side (deteriorated area), so that the pixel component from the deteriorated area flows into the refresh area. Accordingly, the refresh area deteriorates. This is called a vector problem.

An object of the present invention is to solve the above described problem and to provide a moving-picture coding device which achieves low-delay coding using the moving-picture coding method of the H.264 standard.

SUMMARY OF THE INVENTION

A moving-picture coding device that divides a moving-picture signal comprised of a plurality of fields into a plurality of blocks and that can select coded area prediction in a current field and inter-field motion compensation prediction by block units, the moving-picture coding device comprises a forced intra block line determining unit that determines a block line position in which coding is forcedly performed by the coded area prediction in the current field, an intra selecting unit that forcedly selects intra coding with respect to the block line position determined by the forced intra block line determining unit, a vector limit block line determining unit that determines the block line position forcedly limiting a reference field and a reference area of the inter-field motion compensation prediction by an arbitrary block line of the current field, a vector limit unit that forcedly limits the reference field and the reference area of the inter-field motion compensation prediction by a vector limit block line position determined by the vector limit block line determining unit, a slice division unit that forcedly performs slice division at a one-lower block line of the block line selecting the coded area prediction in the current field by the intra selecting unit, and a deblocking filter inhibit unit that forcedly inhibits deblocking filter processing performed across the block line for the slice division performed by the slice division unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
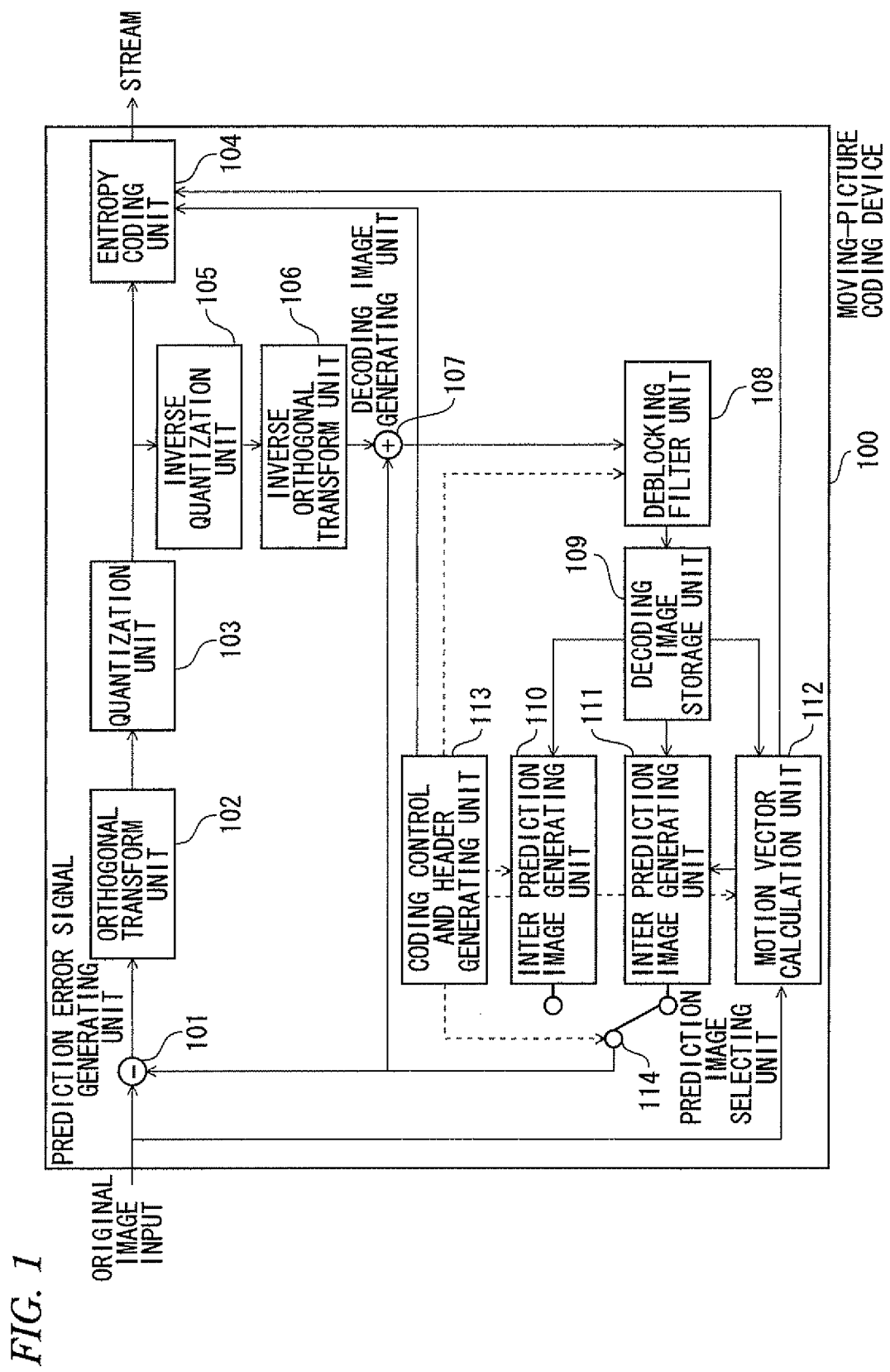
FIG. 1 is a diagram showing an entire configuration of a moving-picture coding device according to the present embodiment.

Reference may now be made in detail to embodiments of the present invention, examples of which are illustrated in the accompanying drawings, wherein like reference numerals refer to like elements throughout.

Description is made below of an embodiment of the present invention based on FIG. 1 to FIG. 15.

FIG. 1 is a diagram illustrating an entire configuration of a moving-picture coding device 100 related to the embodiment of the present invention. As described in FIG. 1, the moving-picture coding device 100 according to the present embodiment includes a prediction error signal generating unit 101, an orthogonal transform unit 102, a quantization unit 103, an entropy coding unit 104, an inverse quantization unit 105, an inverse orthogonal transform unit 106, a decoding image generating unit 107, a deblocking filter unit 108, a decoding image storage unit 109, an intra prediction image generating unit 110, an inter prediction image generating unit 111, a motion vector calculation unit 112, a coding control and header generating unit 113, and a prediction image selecting unit 114. Overview of each function unit is described below.

The prediction error signal generating unit 101 obtains macroblock data (hereinafter may be referred to as block data) in which a current picture of moving-picture data inputted is divided into blocks of 16*16 pixels (hereinafter referred to as macroblock (MB)). The prediction error signal generating unit 101 generates the prediction error signal by the macroblock data and the macroblock data of the prediction image picture provided by the prediction image selecting unit 114. The prediction error signal generating unit 101 gives the generated prediction error signal to the orthogonal transform unit 102.

The orthogonal transform unit 102 performs orthogonal transform processing on the inputted prediction image signal. The signals are separated into a frequency component in a horizontal direction and a frequency component in a vertical direction by the orthogonal transform process. The orthogonal transform unit 102 provides the signals to the quantization unit 103. The quantization unit 103 quantizes an output of the orthogonal transform unit 102. The quantization unit 103 reduces the coding amount of the prediction error signal by performing the coding. The quantization unit 103 provides the signal to the entropy coding unit 104 and the inverse quantization unit 105.

The entropy coding unit 104 performs entropy coding (variable-length coding) on the output from the quantization unit 103 before outputting the output. The entropy coding is a method for allocating variable-length codes according to frequency of appearance of a symbol.

The inverse quantization unit 105 performs inverse quantization on the output of the quantization unit 103 before providing to the inverse orthogonal transform unit 106. The inverse orthogonal transform unit 106 performs the inverse orthogonal transform processing on the output of the inverse quantization unit 105 before providing the output to the decoding image generating unit 107. The decoding process performed by the inverse quantization unit 105 and the inverse orthogonal transform unit 106 can obtain a signal which is nearly equal to the prediction error signal which has not been coded.

The decoding image generating unit 107 reproduces the block data predicting a current image data picture and gives the block data to the deblocking filter unit 108 by adding the block data of the picture given the motion compensation by the inter prediction image generating unit 111 with the prediction error signal given decoding processing by the inverse quantization unit 105 and the inverse orthogonal transform unit 106.

The deblocking filter unit 108 provides the filter to the decoding image which is the output of the decoding image generating unit 107 in order to reduce the block distortion and gives the decoding image to the decoding image storage unit 109.

The decoding image storage unit 109 stores the block data which is given as data of a new reference picture. The decoding image storage unit 109 gives the data to the intra prediction image generating unit 110, the inter prediction image generating unit 111, and the motion vector calculation unit 112.

The intra prediction image generating unit 110 generates the prediction image by the neighboring pixel of the picture which has already been coded.

On the other hand, the inter prediction image generating unit 111 performs the motion compensation on the data of the reference picture in order to generate the block data as the reference picture given the motion compensation. The reference picture is obtained from the decoding image storage unit 109 by the motion vector provided by the motion vector calculation unit 112.

The reference picture has already been coded. The motion vector calculation unit 112 calculates the motion vector by using the block data of the current image data picture and the block data of the reference picture obtained by the decoding image storage unit 109. The motion vector is a value indicating spatial distortion in blocks. The spatial distortion is obtained by using block matching technique for searching a position in which the reference picture is most similar to the current picture in blocks. The motion vector calculation unit 112 gives the calculated motion vector to the inter prediction image generating unit 111.

The block data outputted from the intra prediction image generating unit 110 and the inter prediction image generating unit 111 is inputted to a prediction image selecting unit 114, and either of the prediction images can be selected. The selected block data is provided to the prediction error signal generating unit 101.

The entire control of the coding and header generation are performed by the coding control and header generating unit 113. Notification indicates whether or not the slice division is performed for the intra prediction image generating unit 110. Notification indicates whether or not the deblocking filter is provided for the deblocking filter unit 108. Notification of a reference image limit is given to the motion vector calculation unit 112. Then the header information of the H.264 standard is generated using the control results. The generated header information is given to the entropy coding unit 104 and is outputted with the image data and the motion vector data as a stream.

Figure 2:
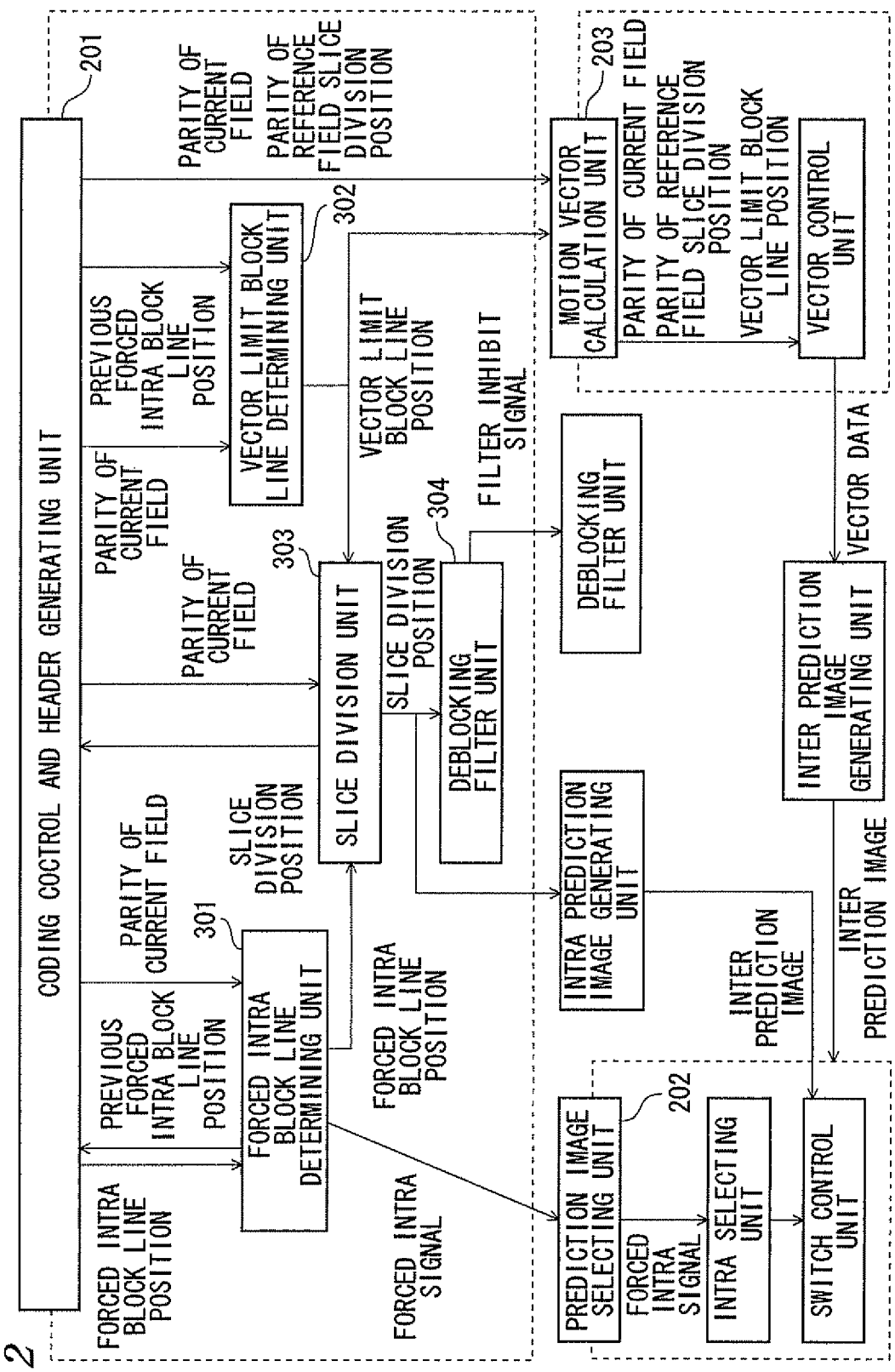
FIG. 2 is a diagram showing the present invention function and a flow of data according to the present embodiment.

FIG. 2 shows a flow of the data between function blocks of the present invention. FIG. 2 shows that the low-delay coding in the moving-picture coding method H.264 includes functions as described later for a coding control and header generating unit 201 (corresponding to the coding control and header generating unit 113 of FIG. 1). The functions include a prediction image selecting unit 202 (corresponding to the prediction image selecting unit 114 of FIG. 1), and a motion vector calculation unit 203 (corresponding to the motion vector calculation unit 112 of FIG. 1).

Figure 3:
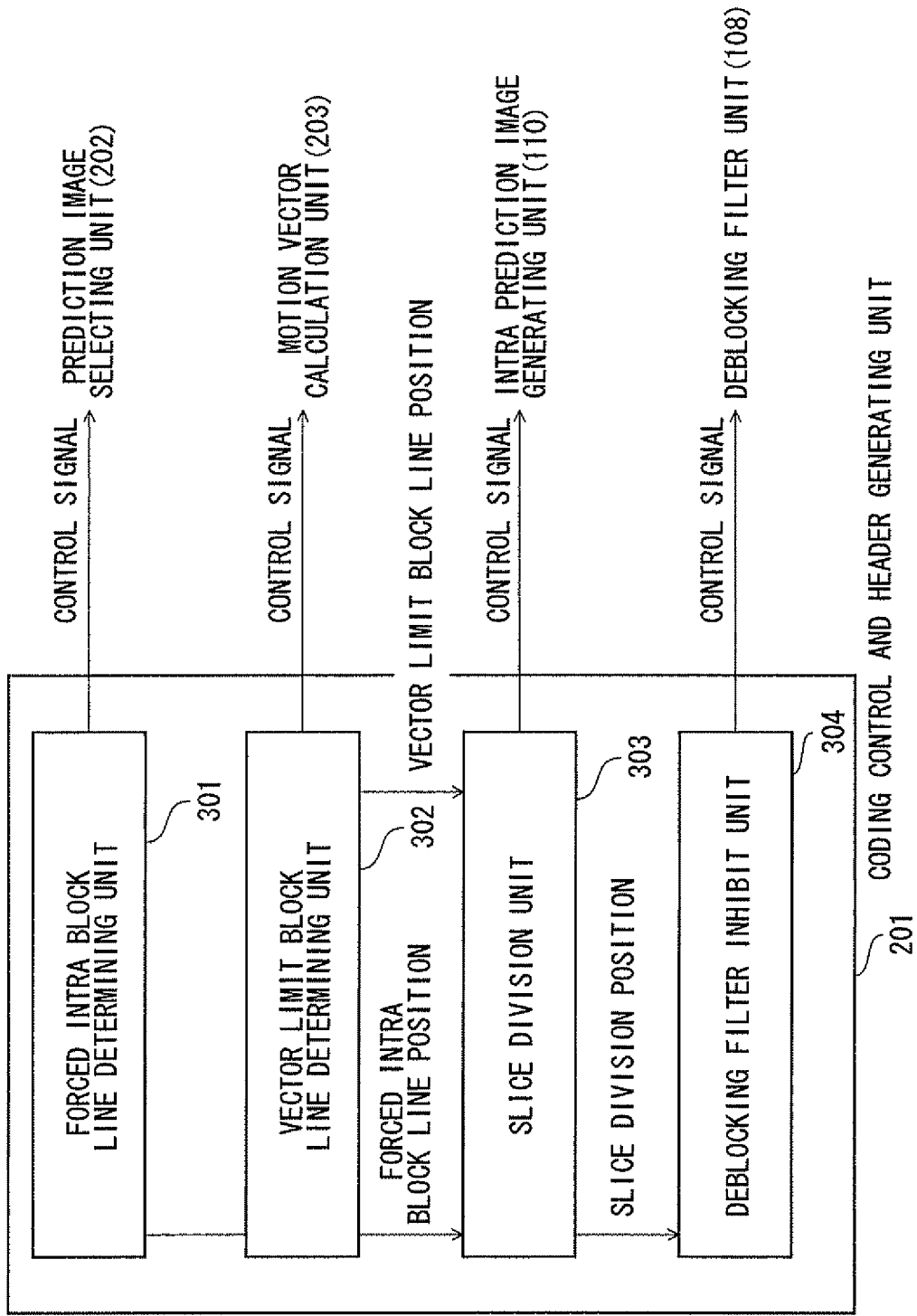
FIG. 3 is a diagram showing a configuration of a coding control and header generating unit according to the present embodiment.

As shown in FIG. 2 and FIG. 3, the coding control and header generating unit 201 according to the present embodiment includes, a forced intra block line determining unit 301, a vector limit block line determining unit 302, a slice division unit 303, and a deblocking filter inhibit unit 304. Description is made of each function as follows.

Figure 4:
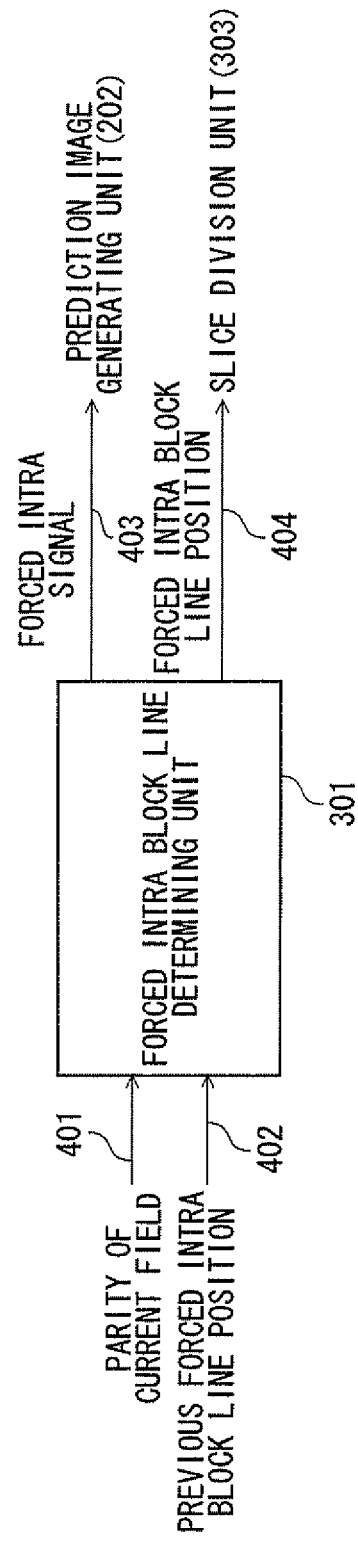
FIG. 4 is a diagram showing a configuration of a forced intra block line determining unit according to the present embodiment.

As shown in FIG. 2 and FIG. 4, the forced intra-block line determining unit 301 receives a parity 401 of a current field and a previous forced intra block line position 402 as input, and outputs a forced intra signal 403 to the prediction image selecting unit 202. Moreover, the forced intra block line determining unit 301 outputs a forced intra block line position 404 to the slice division unit 303 and the coding control and header generating unit 201.

Figure 5:
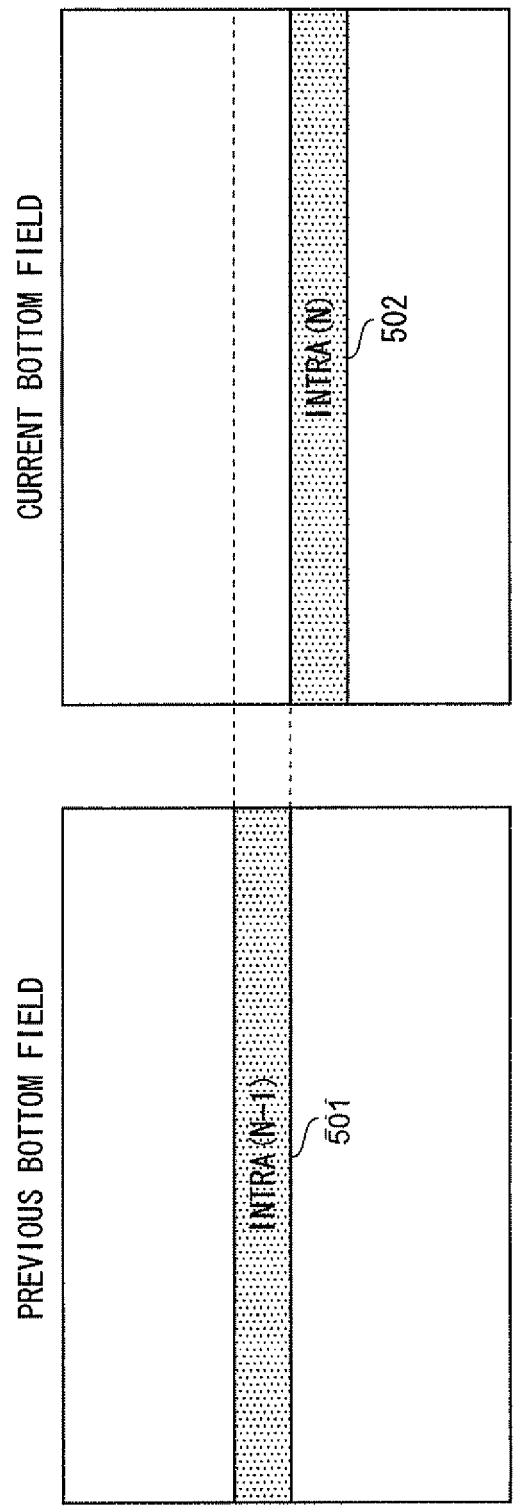
FIG. 5 is a diagram showing an operation of the forced intra block line determining unit according to the present embodiment.

As shown in FIG. 5, the forced intra block line determining unit 301 determines that an N line, which is one line below, is a current forced intra block line position 502 when the parity of the current field is the bottom field and a previous forced intra block line position 501 is an N−1$^{th}$ line. The forced intra signal 403 is outputted to the prediction image selecting unit 202 when the macroblock being coded is included in the current forced intra block line position 502. Further, the forced intra block line determining unit 301 outputs the forced intra block line position 404 to the slice division unit 303. However, a leading block line of the picture is the current forced intra block line position 502 when the previous forced intra block line position 501 reaches a lower limit of the picture.

Figure 6:
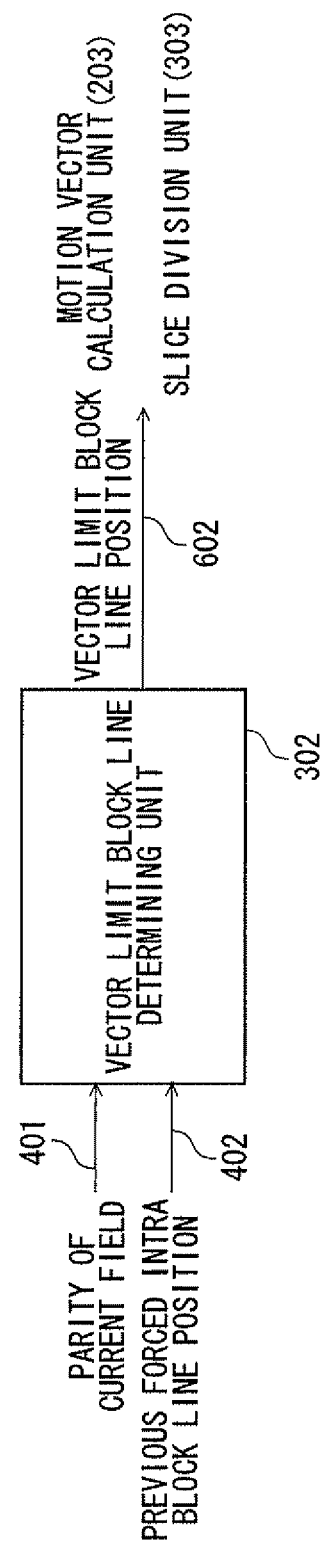
FIG. 6 is a diagram showing a configuration of a vector limit block line determining unit according to the present embodiment.

As shown in FIG. 6, the vector limit block line determining unit 302 receives the previous forced intra block line position 402 and the parity 401 of the current field as input, and outputs a vector limit block line position 602 to the motion vector calculation unit 203. Similarly, the vector limit block line determining unit 302 outputs the vector limit block line position 602 to the slice division unit 303.

Figure 7:
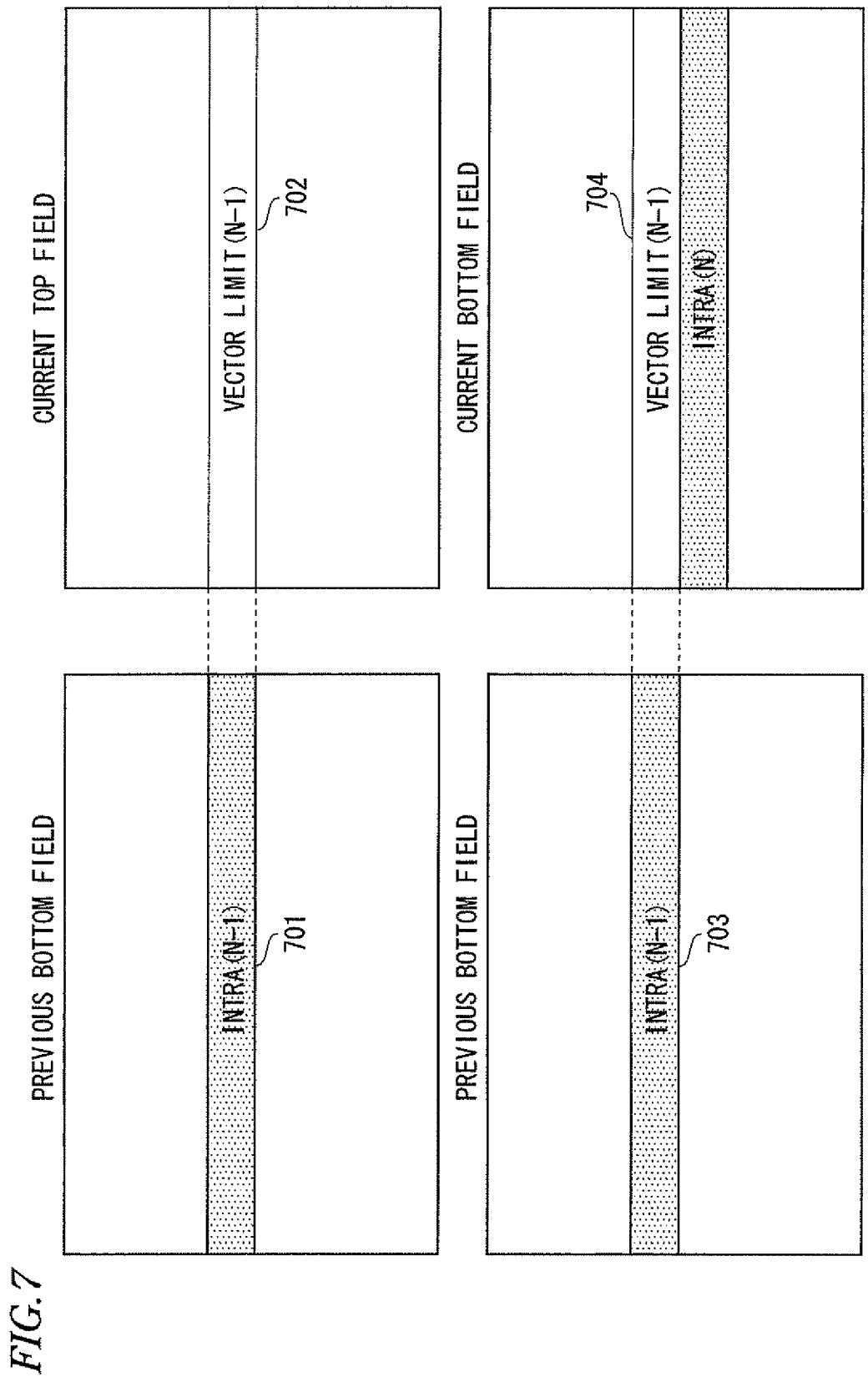
FIG. 7 is a diagram showing an operation of the vector limit block line determining unit according to the present embodiment.

As shown in FIG. 7, the vector limit block line determining unit 302 determines that, in the case when the current picture is the top field, when a previous intra block line position 701 existing in the previous bottom field is the N−1th line, the N−1 line at the same position as the current picture is a vector limit block line position 702. In the case when the current picture is the bottom field, the N−1 line in the same position is a vector limit block line position 704 when a previous forced intra block line position 703 existing in the previous bottom field is the N−1th line.

In this case, when the macroblock being coded of the current picture exists above the vector limit block line position described above, the vector limit block line determining unit 302 outputs the vector limit block line position 602 to the motion vector calculation unit 203. Similarly, the vector limit block line determining unit 302 outputs the vector limit block line position 602 to the slice division unit 303.

Figure 8:
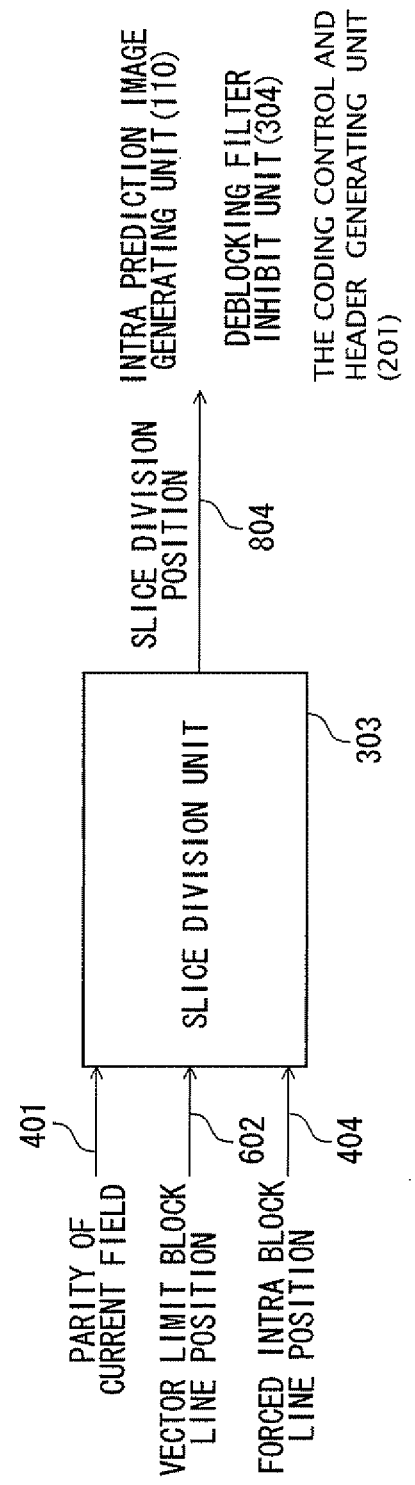
FIG. 8 is a diagram showing a configuration of a slice division unit according to the present embodiment.

As shown in FIG. 8, the slice division unit 303 receives the parity 401 of the current field, the vector limit block line position 602, and the forced intra block line position 404 as input, and outputs a slice division position 804 to an intra prediction image generating unit 110. Further, the slice division unit 303 outputs the slice division position 804 to the deblocking filter inhibit unit 304 and the coding control and header generating unit 201.

Figure 9:
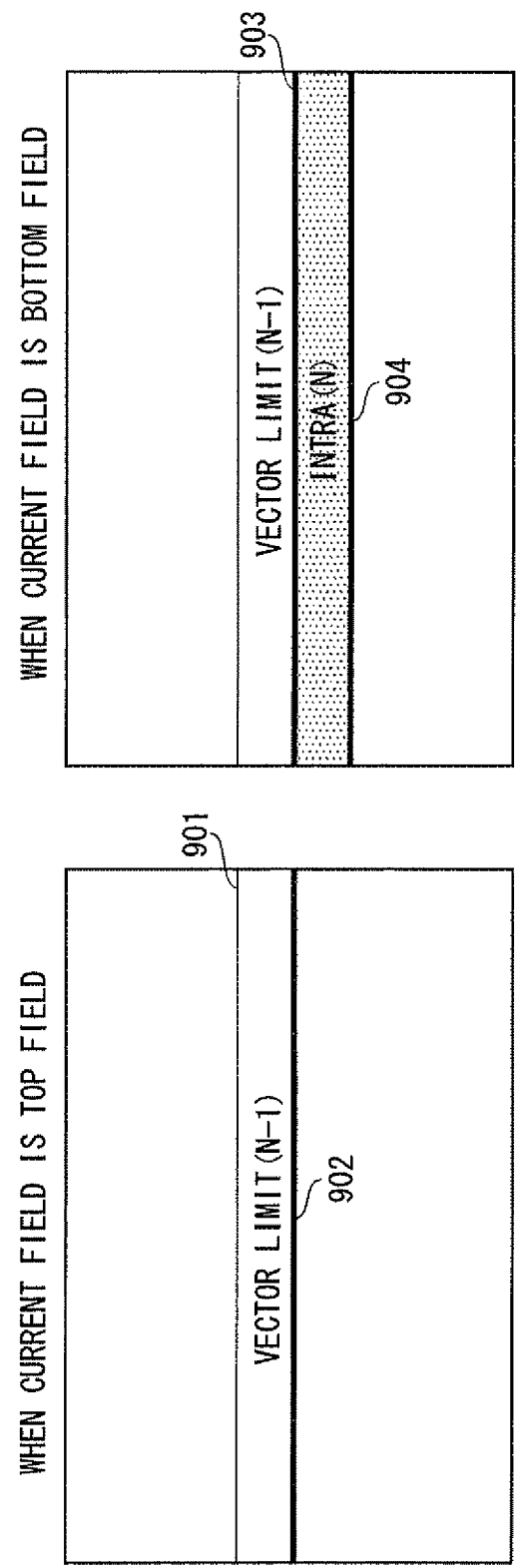
FIG. 9 is a diagram showing an operation of the slice division unit according to the present embodiment.

As shown in FIG. 9, when the parity of the current field is the top field, the slice division unit 303 performs the slice division at the boundary between a vector limit block line position 901 and the block line which is one line below. Further, when the parity of the current field is the bottom field, the slice division unit 303 performs the slice division at the boundary of a forced intra block line position 903 and the block line which is one line below, and outputs slice division positions 902 and 904 to the intra prediction image generating unit.

Similarly, the slice division unit 303 outputs the slice division positions 902 and 904 to the deblocking filter inhibit unit. However, the slice division is not required when the slice division positions 902 and 904 reach the lower limit of the picture. In this case, in the coding control and header generating unit 201, the slice division occurs and the information indicating that the deblocking filter is not provided at a slice boundary is generated as the header information of the H.264 standard. To be precise, the slice header information of the H.264 is generated in order to set a leading macroblock number of the slice division position to "first_mb_in_slice" which is a syntax. Further, 2 (meaning that the deblocking filter is not provided at the slice boundary) is set to "disable_deblocking_filter_idc".

Figure 10:
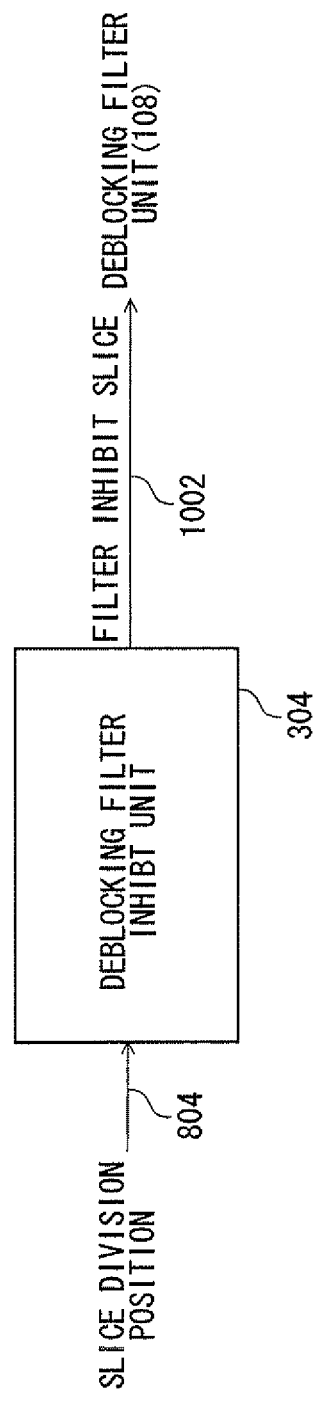
FIG. 10 is a diagram showing a configuration of a deblocking filter inhibit unit according to the present embodiment.

As shown in FIG. 10, the deblocking filter inhibit unit 304 receives the slice division position 804 obtained by the slice division unit 303 as input, and outputs a filter inhibit signal 1002 to the deblocking filter unit 108.

Figure 11:
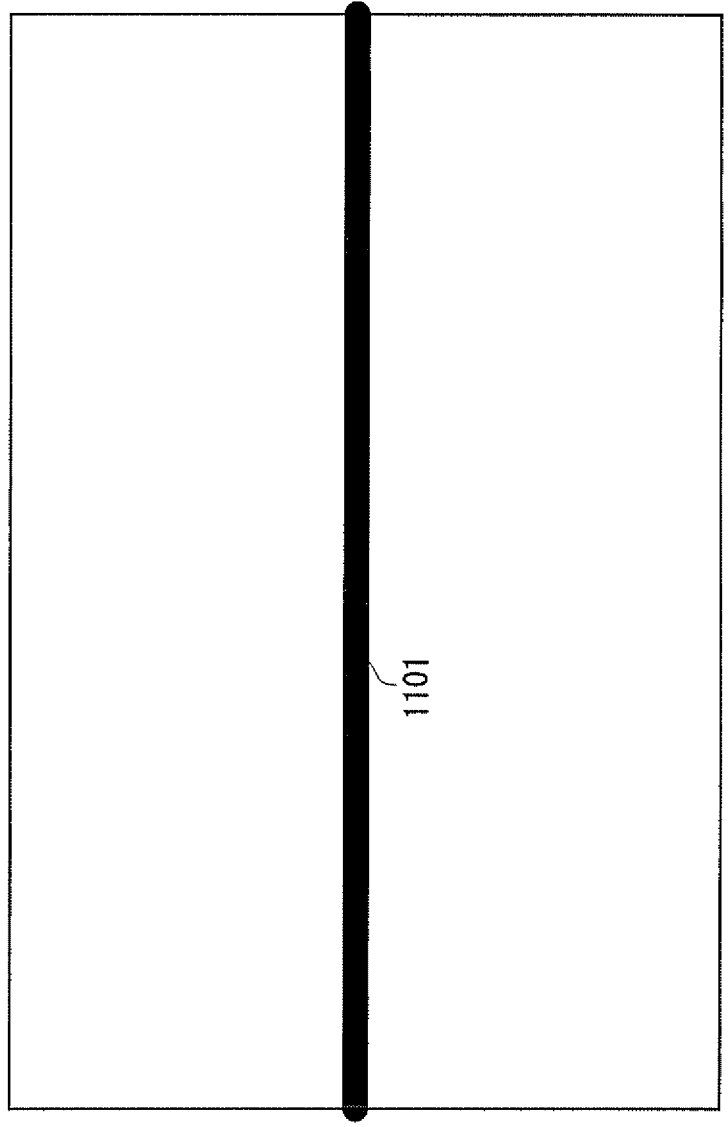
FIG. 11 is a diagram showing an operation of the deblocking filter inhibit unit according to the present embodiment.

As shown in FIG. 11, the deblocking filter inhibit unit 304 outputs the filter inhibit signal 1002 to the deblocking filter unit 108 when the macroblock being coded includes a deblocking filter inhibit position 1101.

Figure 12:
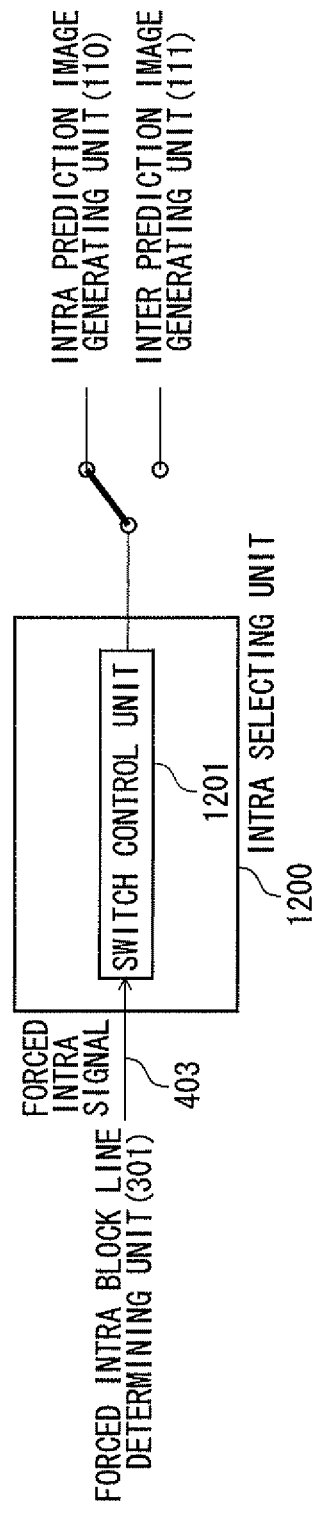
FIG. 12 is a diagram showing a configuration and an operation of an intra selecting unit according to the present embodiment.

The prediction image selecting unit 202 according the present embodiment includes an intra selecting unit 1200 as shown in FIG. 12. The intra selecting unit 1200 includes a switch control unit 1201. The intra selecting unit 1200 receives the forced intra signal 403 outputted from the forced intra block line determining unit 301 as input, forcibly selects the intra prediction for the macroblock indicated by the forced intra signal 403, and receives the output of the intra prediction image generating unit 110.

Figure 13:
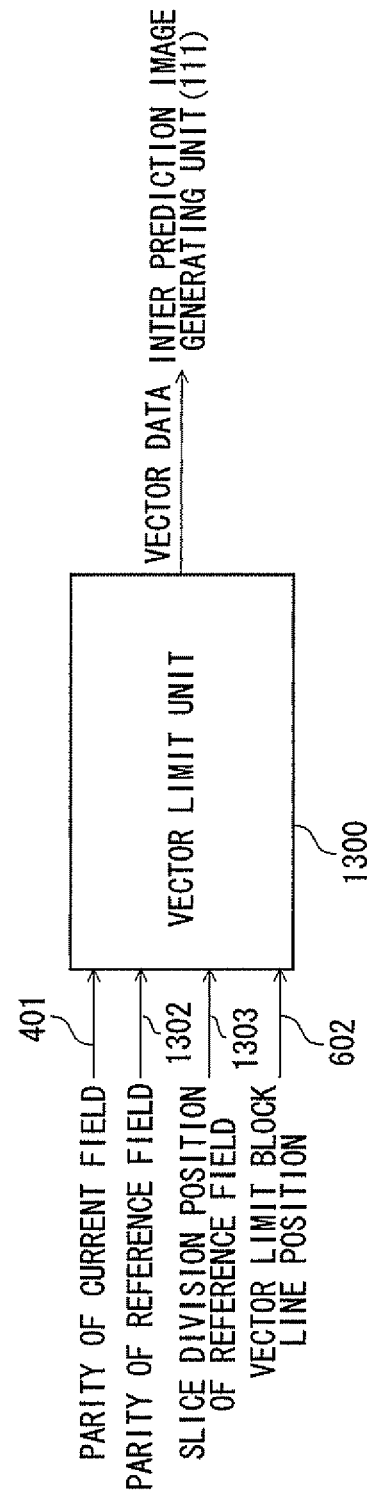
FIG. 13 is a diagram showing a configuration of a vector limit unit according to the present embodiment.

The vector calculation unit 203 according to the present embodiment includes a vector limit unit 1300 as shown in FIG. 13. The vector limit unit 1300 receives the parity 401 of the current field, a parity 1302 of the reference field, a slice division position 1303 of the reference field, and the vector limit block line position 602 as input. The vector limit unit 1300 outputs a vector data 1305 to the inter prediction image generating unit 111.

Figure 14:
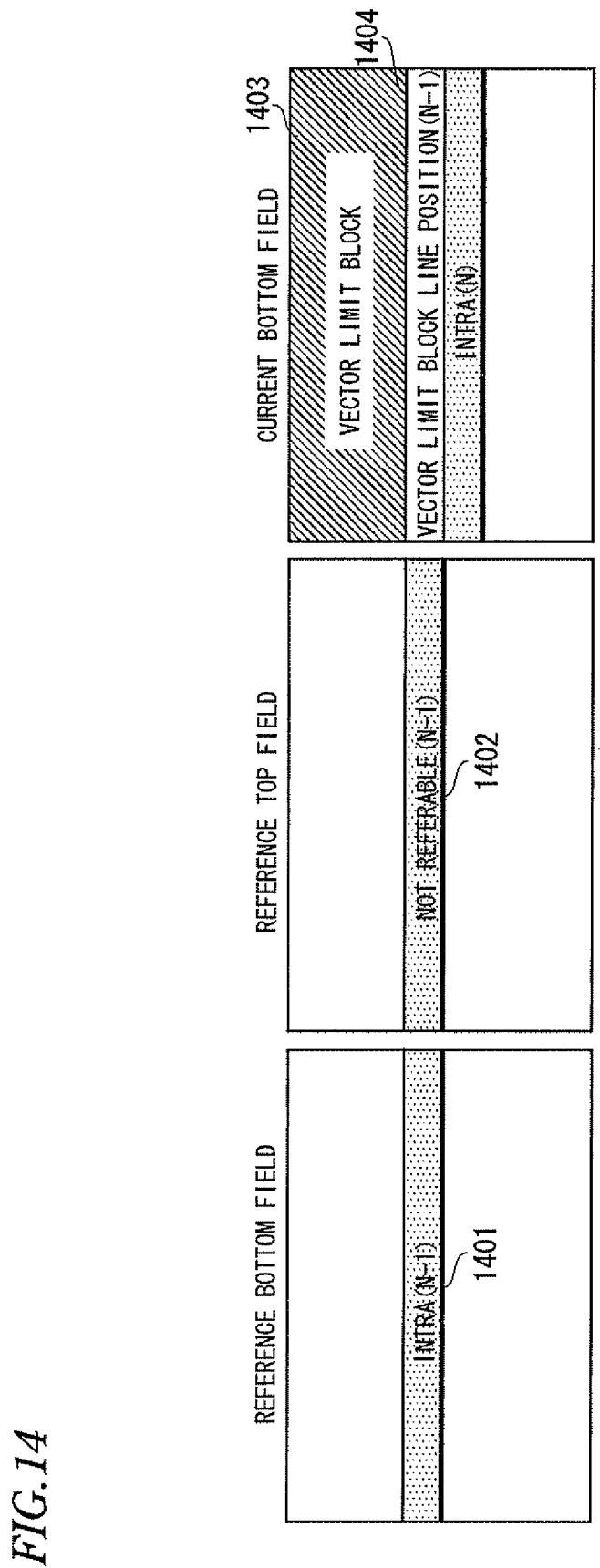
FIG. 14 is a diagram showing an operation of the vector limit unit according to the present embodiment.

As shown in FIG. 14, a vector limit target block 1403 includes a vector limit block line position 1404. The vector limit unit 1300 makes only the upper side of a slice division position 1401 of the reference field referable. When the parity of the current field is the bottom field and the parity of the reference field is the top field, a block line 1402 existing in the same position as the vector limit block line position 1404 is made not to be referred.

The motion vector calculation unit 203 according to the present embodiment receives the slice division position 804 from the slice division unit 303 and inhibits the prediction mode used for the prediction across the slice boundary for the macroblock below the slice boundary. This is specified by the H.264. The deblocking filter unit 108 according to the present embodiment receives the filter inhibit signal 1002 from the deblocking filter inhibit unit 304 and inhibits the filter processing across the slice boundary.

Figure 15:
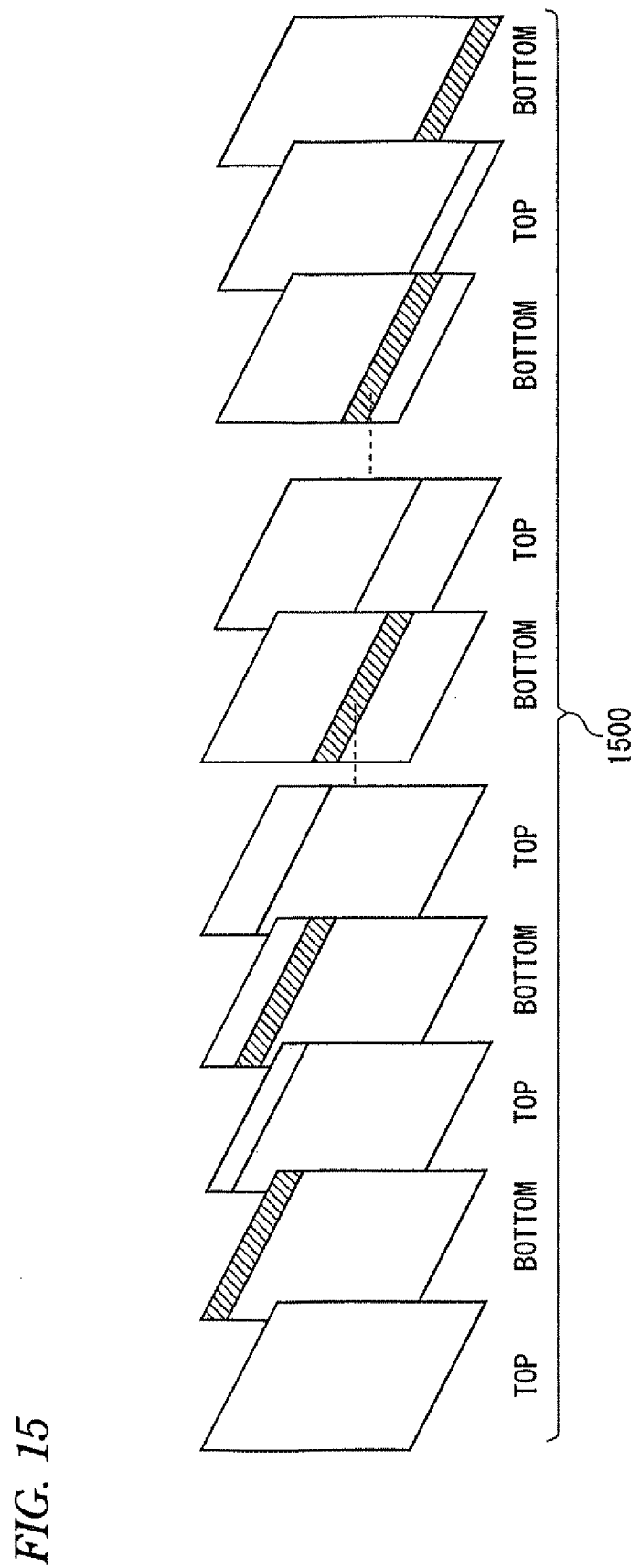
FIG. 15 is a diagram showing a configuration of a bit stream to be generated according to the present embodiment.

A configuration example of the bit stream generated by the embodiment described above is shown in FIG. 15. A video sequence of FIG. 15 is formed by repeating a bit stream 1500. In the bit stream 1500, the refresh by the intra slice is performed only on the image of the bottom field, and the reference source of the top field is the area where the refresh is completed. As a result, it is possible to obtain the effect similar to that of the refresh performed as for the top field. This bit stream is compliant with the specification of the H.264. That is, the moving-picture decoding device corresponding to the H.264 standard does not require adding special processing or devices, and is capable of reproducing the stream.

Next, description is made of a relation with the problems to be solved by the invention. As for the intra slice problem, an arbitrary macroblock line is forcibly configured with the intra macroblock by the forced intra block line determining unit 301 and the intra selecting unit 1200 according to the present embodiment. This makes it possible to generate an equivalent to the intra slice.

As for the intra prediction efficiency problem, the slice division unit 303 according to the present embodiment sets the slice boundary below the forced intra block line position. This provides no limit of the prediction mode to the intra macroblock included in the forced intra block line.

As for the deblocking filter problem, the deblocking filter inhibit unit 304 inhibits the filter processing across the slice boundary. This prevents the pixel component from flowing into the refresh area from the deteriorated area.

As for the vector problem, when the parity of the current field is the bottom field and the parity of the reference field is the top field, the controversial area is made not to be referred to by the vector limit block line determining unit 302 and the vector limit unit 1300 according to the present embodiment. This prevents the pixel component from flowing into the refresh area from the deteriorated area. As described above, it is possible to provide the moving-picture coding device which uses the moving-picture coding method H.264 in order to achieve the low-delay coding.

Furthermore, the orthogonal transform unit described above can be replaced with a similar process such as the discrete cosine transform. The entropy coding unit also can be replaced with a unit capable of achieving the similar function, such as variable length coding and arithmetic coding.

According to the present invention, it is possible to provide the moving-picture coding device which achieves the low-delay in the case of using the moving-picture coding method (H.264) for coding the moving-image signal comprised of a plurality of fields.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A moving-picture coding device that divides a moving-picture signal comprised of a plurality of fields into a plurality of blocks and selects a coded area prediction in a current field and inter-field motion compensation prediction by block units, the moving-picture coding device comprising:

a memory; and
a processor that executes a procedure in the memory, the procedure including:
a forced intra block line determining process that determines a block line position in which coding is forcedly performed by the coded area prediction in the current field;
an intra selecting process that forcedly selects intra coding with respect to the block line position determined by the forced intra block line determining process;
a vector limit block line determining process that determines a block line position forcedly limiting a reference field and a reference area of the inter-field motion compensation prediction by an arbitrary block line of the current field;
a vector limit process that forcedly limits the reference field and the reference area of the inter-field motion compensation prediction by a vector limit block line position determined by the vector limit block line determining process;
a slice division process that forcedly performs slice division at a first one-lower block line of a block line selecting the coded area prediction in the current field by the intra selecting process; and
a deblocking filter inhibit process that forcedly inhibits deblocking filter processing performed across a block line of the current field for the slice division performed by the slice division process,
wherein the vector limit process performs:
a first vector limit to receive a parity of the current field, a parity of the reference field, a slice division position of the reference field, and the vector limit block line position, and makes only an upper part of a slice division position of a reference field referable in a block above the vector limit block line position, and
a second vector limit to make a block line of the reference field that is in a position same as a vector limit block line position non-referable if a parity of the current field is a bottom field and a parity of the reference field is a top field,
wherein the slice division process receives the parity of the current field, the forced intra block line position, and the vector limit block line position, performs the slice division at a boundary between the vector limit block line position and the one lower block line if the parity of the current field is the top field, and performs the slice division at a boundary of a forced intra block line position and the one lower block line if the parity of the current field is the bottom field.

2. The moving-picture coding device according to claim 1, wherein the forced intra block line determining process receives, as an input, the parity of the current field and the block line position determined by the forced intra block line determining process, and determines a second one-lower line of the block line position determined by the forced intra block line determining process as a current forced intra block line position.

3. The moving-picture coding device according to claim 2, wherein the intra selecting process selects the coded area prediction in the current field for a macroblock with respect to a macroblock included in the forced intra block line position according to the forced intra block line determining process.

4. The moving-picture coding device according to claim 3, wherein the vector limit block line determining process receives the forced intra block line position as an input, and determines a line that is in a position same as the forced intra block line position.

5. A moving-picture coding method in which a moving-picture signal comprised of a plurality of fields is divided into a plurality of blocks, and coded area prediction in a current field and inter-field motion compensation prediction are selectable, the moving-picture coding method comprising:
- determining a forced intra block line for determining an intra block line position in which coding is forcedly performed by the coded area prediction in the current field;
- selecting the coding forcedly performed by the coded area prediction in the current field with respect to the forced intra block line determined by determining the forced intra block line;
- determining a vector limit block line position for determining the block line position that forcedly limits a reference field and a reference area of the coding performed by the inter-field motion compensation prediction in an arbitrary block line of the current field;
- limiting the reference field and the reference area of the coding performed by the inter-field motion compensation prediction in the vector limit block line position determined by determining the vector limit block line position;
- performing a slice division forcedly at a boundary between a block line selecting the coding by the coded area prediction in the current field and a block line in which the limiting performs a reference limit, and a first one lower block line; and
- forcedly inhibiting deblocking filter processing performed across the block line of the current field in which the slice division is performed by slice division,
- wherein the vector limit performs:
- a first vector limit to receive, as an input, a parity of the current field, the parity of the reference field, the slice division position, and the vector limit block line position, and makes only an upper part of a slice division position of the reference field referable in a block above the vector limit block line position; and
- a second vector limit to make the block line of the reference field that is in a same position as the vector limit block line position non-referable if the parity of the current field is a bottom field and the parity of the reference field is a top field,
- wherein the slice division receives, as an input, the parity of the current field, the forced intra block line position, and the vector limit block line position, performs the slice division at the boundary between the vector limit block line position and the one lower block line if the parity of the current field is the top field, and performs the slice division at the boundary between a forced intra block line position and the one lower block line if the parity of the current field is the bottom field.

6. The moving-picture coding method according to claim 5, wherein the determining a forced intra block line receives, as an input, the parity of the current field and the forced intra block line position, and determines a position of a second line that is one line below the forced intra block line position as a current forced intra block line position.

7. The moving-picture coding method according to claim 5, wherein determining the vector limit block line position selects the coding by the coded area prediction in the current field for a macroblock with respect to a macroblock included in the forced intra block line position according to the determined forced intra block line.

8. The moving-picture coding method according to claim 5, wherein the determining the vector limit block line position receives, as an input, the forced intra block line position, and determines a line that is in a same position as the forced intra block line position as the vector limit block line position.

* * * * *

UNITED STATES PATENT AND TRADEMARK OFFICE
CERTIFICATE OF CORRECTION

| | | |
|---|---|---|
| PATENT NO. | : 8,780,989 B2 | Page 1 of 1 |
| APPLICATION NO. | : 12/170098 | |
| DATED | : July 15, 2014 | |
| INVENTOR(S) | : Hidenobu Miyoshi et al. | |

It is certified that error appears in the above-identified patent and that said Letters Patent is hereby corrected as shown below:

On the Title page, Item [57] (Abstract), Line 8, After "division unit" insert -- and --.

Signed and Sealed this
Fourth Day of November, 2014

Michelle K. Lee
*Deputy Director of the United States Patent and Trademark Office*